(12) United States Patent
Cho et al.

(10) Patent No.: US 12,148,570 B2
(45) Date of Patent: Nov. 19, 2024

(54) MULTILAYER ELECTRONIC COMPONENT (71) Applicant: SAMSUNG ELECTRO-MECHANICS CO., LTD., Suwon-si (KR)

(72) Inventors: Min Jung Cho, Suwon-si (KR); Byung Kun Kim, Suwon-si (KR); Yu Hong Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/136,543

(22) Filed: Apr. 19, 2023

(65) Prior Publication Data

US 2023/0260701 A1 Aug. 17, 2023

Related U.S. Application Data

(63) Continuation of application No. 17/357,550, filed on Jun. 24, 2021, now Pat. No. 11,664,162.

(30) Foreign Application Priority Data

Nov. 19, 2020 (KR) .......................... 10-2020-0155482

(51) Int. Cl.
*H01G 4/12* (2006.01)
*H01G 4/008* (2006.01)
(Continued)

(52) U.S. Cl.
CPC ........... *H01G 4/1218* (2013.01); *H01G 4/008* (2013.01); *H01G 4/012* (2013.01); *H01G 4/30* (2013.01)

(58) Field of Classification Search
CPC ........ H01G 4/30; H01G 4/012; H01G 4/1227; H01G 4/2325; H01G 4/008; H01G 4/0085;
(Continued)

(56) References Cited

U.S. PATENT DOCUMENTS

2001/0055704 A1* 12/2001 Hosokura ............. C04B 35/645
428/699
2004/0256603 A1* 12/2004 Celik ................... H01G 4/0085
252/500

(Continued)

FOREIGN PATENT DOCUMENTS

JP 2000-348536 A 12/2000
KR 10-2012-0062237 A 6/2012
KR 10-2016-0143516 A 12/2016

OTHER PUBLICATIONS

"MLCC Product Development Trend," (English translation), vol. 14, No. 1, pp. 41-45 (Feb. 2011).
(Continued)

*Primary Examiner* — Michael P McFadden
(74) *Attorney, Agent, or Firm* — Morgan, Lewis & Bockius LLP (57) ABSTRACT

A multilayer electric component includes a body including a dielectric layer and internal electrodes alternately stacked with the dielectric layer interposed therebetween and external electrodes disposed on the body and connected to the internal electrodes, wherein the internal electrodes include Cu and Ni and a coefficient of variation (CV) value of Cu/Ni (percent by weight) in a region thereof, 5 nm deep from an interface with the dielectric layer is 25.0% or less.

16 Claims, 4 Drawing Sheets (51) Int. Cl.
  *H01G 4/012* (2006.01)
  *H01G 4/30* (2006.01)
(58) Field of Classification Search
  CPC .......... H01G 4/12; H01G 4/224; H01G 4/228; H01G 4/248; H01G 2/065; H01G 4/1218; H01G 4/232
  See application file for complete search history.

(56) References Cited

U.S. PATENT DOCUMENTS

| | | | |
|---|---|---|---|
| 2012/0140375 A1 | 6/2012 | Kim et al. | |
| 2013/0141835 A1* | 6/2013 | Hwang | H01G 4/30 29/829 |
| 2014/0376150 A1* | 12/2014 | Kim | H01G 4/30 361/301.4 |
| 2016/0358712 A1 | 12/2016 | Doi et al. | |
| 2017/0190930 A1* | 7/2017 | Lee | C09D 11/037 |
| 2018/0336998 A1* | 11/2018 | Kitamura | H01G 4/012 |
| 2019/0051460 A1* | 2/2019 | Kawamura | H01G 4/0085 |
| 2019/0267189 A1* | 8/2019 | Makino | H01G 4/0085 |
| 2021/0142947 A1* | 5/2021 | Teraoka | H01G 4/1227 |

OTHER PUBLICATIONS

R. Ishii, et al., "Work function of binary alloys," Applied Surface Science, 2001, 169-170, pp. 658-661.

U.S. Notice of Allowance dated Apr. 26, 2023 issued in U.S. Appl. No. 17/357,550.

Non-Final Office Action dated Sep. 15, 2022 issued in U.S. Appl. No. 17/357,550.

Korean Office Action dated Sep. 26, 2024 issued in Korean Patent Application No. 10-2020-0155482 (with English translation).

* cited by examiner

MULTILAYER ELECTRONIC COMPONENT

CROSS-REFERENCE TO RELATED APPLICATION

This application is a continuation of U.S. patent application Ser. No. 17/357,550, filed on Jun. 24, 2021, which claims the benefit of priority to Korean Patent Application No. 10-2020-0155482 filed on Nov. 19, 2020, the disclosures of which are incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various electronic products such as display devices including liquid crystal displays (LCDs) and plasma display panels (PDPs), computers, smartphones, cell phones, and the like, to allow electricity to be charged therein and discharged therefrom.

The MLCC, advantageously compact, ensures high capacitance, facilitates mounting, and thus may be used as a component of various types of electronic devices. Recently, as components of electronic devices have been miniaturized, demand for smaller multilayer ceramic capacitors having higher capacitance has increased.

However, as internal electrodes and dielectric layers have been reduced in thickness, internal electrode connectivity may be deteriorated and an internal thickness deviation may increase, thereby reducing reliability.

However, as the internal electrode and the dielectric layer are thinned, high temperature load reliability, moisture resistance reliability, and the like are deteriorated. Accordingly, there is a need for a method capable of excellently securing high temperature load reliability, moisture resistance reliability, etc. while internal electrodes and dielectric layers are thinned.

SUMMARY

An aspect of the present disclosure may provide a multilayer electronic component including internal electrodes having improved reliability.

An aspect of the present disclosure may also provide a multilayer electronic component in which high temperature load reliability of internal electrodes is improved.

An aspect of the present disclosure may also provide a multilayer electronic component in which moisture resistance reliability of internal electrodes is improved.

Another aspect of the present disclosure may provide a compact, high-capacitance multilayer electronic component having high reliability.

According to an aspect of the present disclosure, a multilayer electric component may include: a body including a dielectric layer and internal electrodes alternately stacked with the dielectric layer interposed therebetween; and external electrodes disposed on the body and connected to the internal electrodes, wherein the internal electrodes include Cu and Ni and a coefficient of variation (CV) value of Cu/Ni (percent by weight) in a region of the internal electrode 5 nm deep from an interface with the dielectric layer is 25.0% or less.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings. The shape and size of constituent elements in the drawings may be exaggerated or reduced for clarity. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

The contents of the present disclosure described below may have a variety of configurations and propose only a required configuration herein, but are not limited thereto.

In the drawings, an X direction may be defined as a second direction, an L direction, or a length direction, a Y direction may be defined as a third direction, a W direction, or a width direction, and a Z direction may be defined as a first direction, a stacking direction, a T direction, or a thickness direction.

Multilayer Electronic Component

Figure 1:
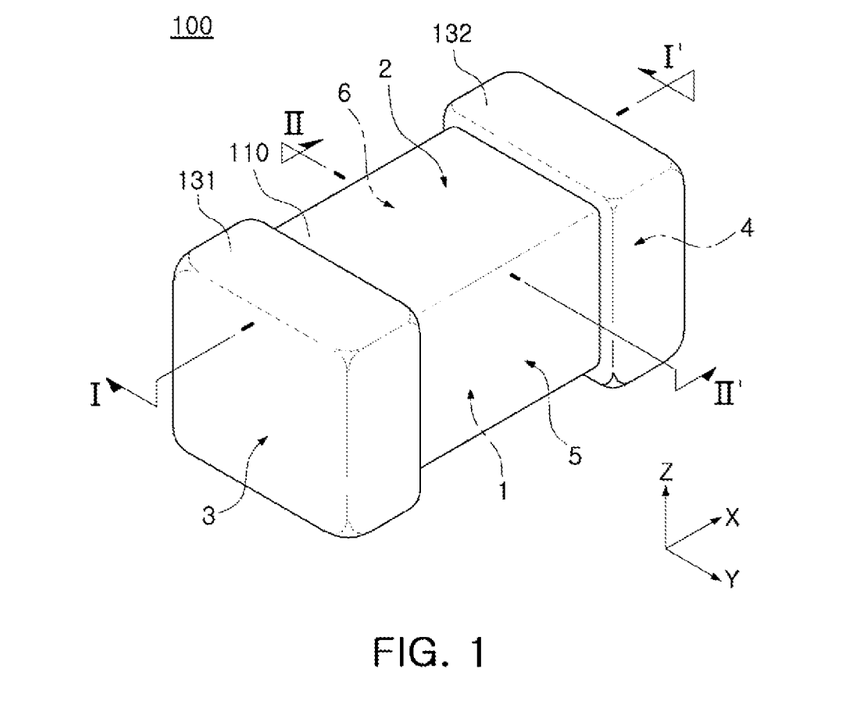
FIG. 1 is a schematic perspective view of a multilayer electronic component according to an exemplary embodiment in the present disclosure.

FIG. 1 is a schematic perspective view of a multilayer electronic component according to an exemplary embodiment in the present disclosure.

Figure 2:
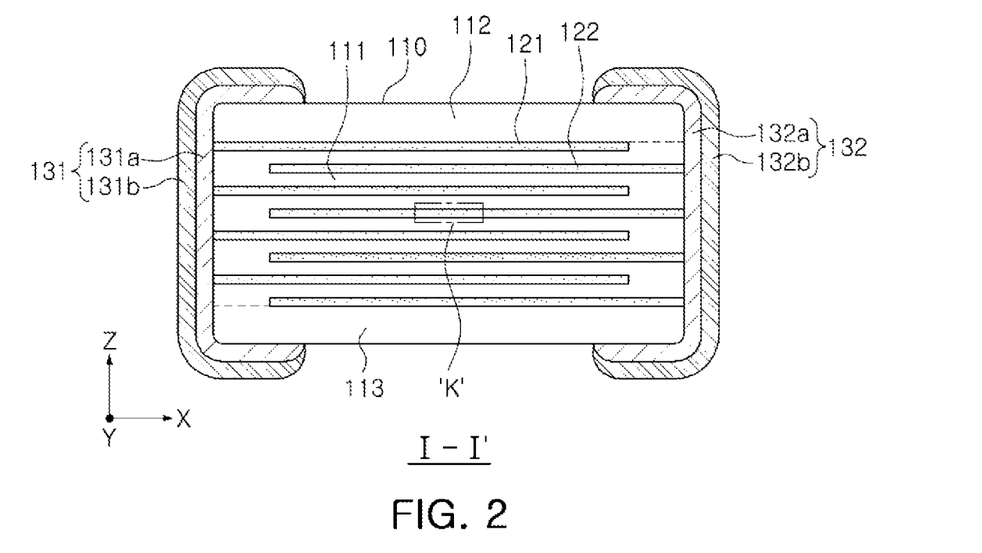
FIG. 2 is a cross-sectional view taken along line I-I' of FIG. 1.

FIG. 2 is a cross-sectional view taken along line I-I' of FIG. 1.

Figure 3:
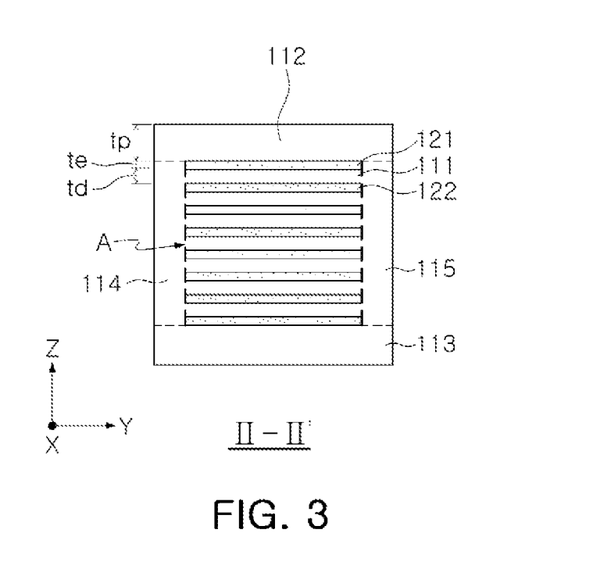
FIG. 3 is a cross-sectional view taken along line II-II' of FIG. 1.

FIG. 3 is a cross-sectional view taken along line II-II' of FIG. 1.

Figure 4:
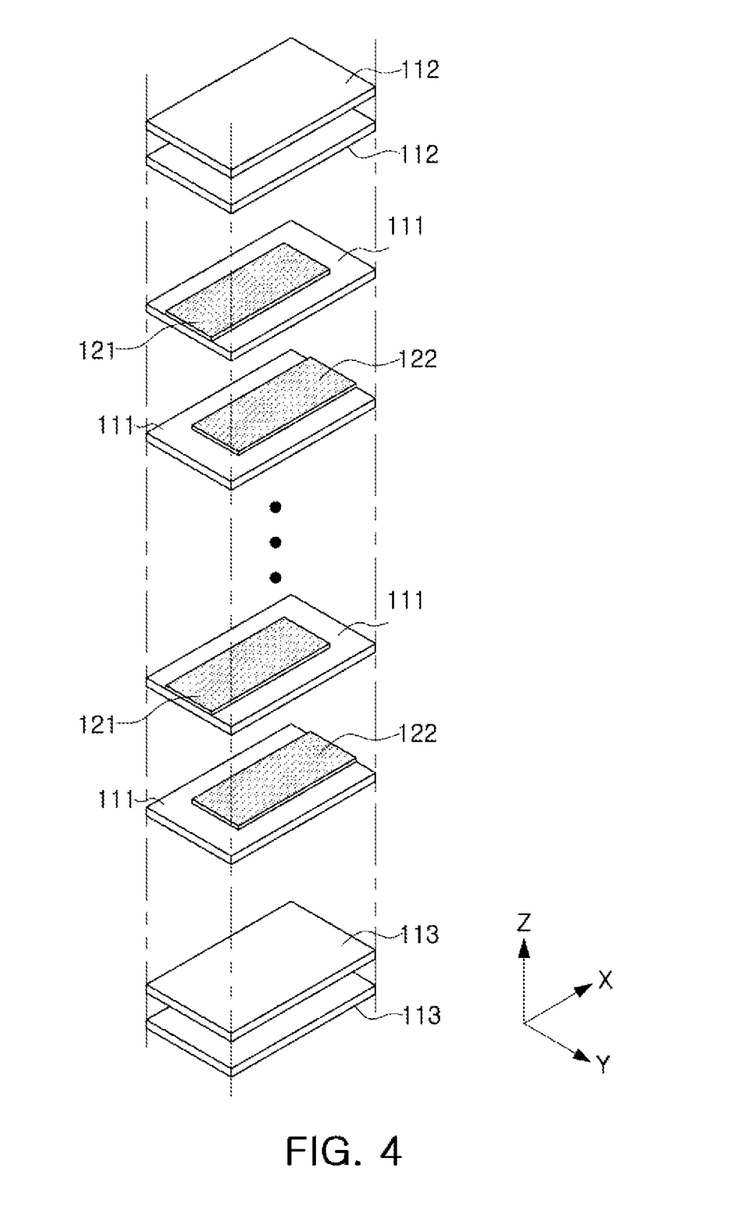
FIG. 4 is an exploded perspective view schematically illustrating a body in which a dielectric layer and an internal electrode are stacked according to an exemplary embodiment in the present disclosure.

FIG. 4 is an exploded perspective view schematically illustrating a body in which a dielectric layer and an internal electrode are stacked according to an exemplary embodiment in the present disclosure.

Figure 5:
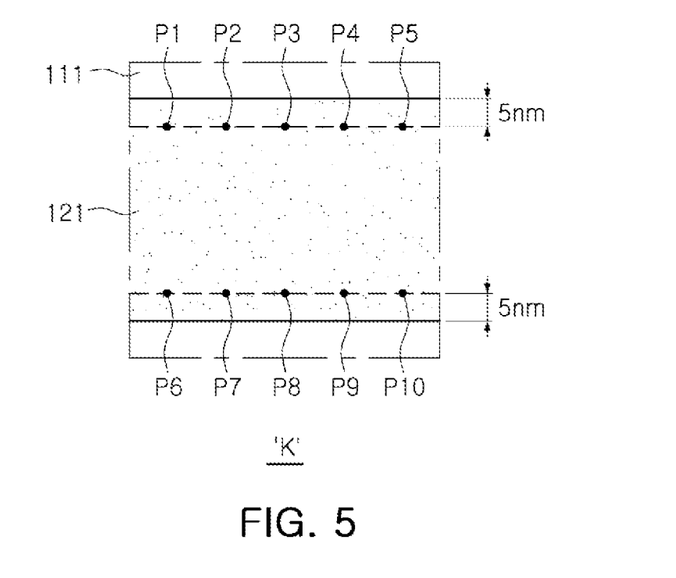
FIG. 5 is an enlarged view of region K of FIG. 2.

FIG. 5 is an enlarged view of region K of FIG. 2.

Hereinafter, a multilayer electronic component according to an exemplary embodiment in the present disclosure will be described in detail with reference to FIGS. 1 through 4.

A multilayer electronic component 100 may include a body 110 including dielectric layers 111 and internal electrodes 121 and 122 alternately disposed with the dielectric layers; and external electrodes 131 and 132 disposed on the body 110 and connected to the internal electrodes 121 and 122, wherein a coefficient of variation (CV) value of Cu/Ni (percent by weight) in a region of the internal electrode 5 nm deep from an interface with the dielectric layer is 25.0% or less.

In the body 110, the dielectric layer 111 and the internal electrodes 121 and 122 are alternately stacked.

There is no particular limitation to a specific shape of the body 110 but, as shown, the body 110 may have a hexahedral shape or a shape similar thereto. Due to contraction (or shrinkage) of ceramic powder particles included in the body 110 during a sintering process, the body 110 may have a substantially hexahedral shape, but may not have a hexahedral shape with perfectly straight lines.

The body 110 may have first and second surfaces 1 and 2 opposing each other in the thickness direction (Z direction), third and fourth surfaces 3 and 4 connected to the first and second surfaces 1 and 2 and opposing each other in the width direction (Y direction), and fifth and sixth surfaces 5 and 6 connected to the first and second surfaces 1 and 2, connected to the third and fourth surfaces 3 and 4, and opposing each other in the length direction (X direction).

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $BaTiO_3$ and $(Ba_{1-x}Ca_x) TiO_3$, $Ba (Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, plasticizers, binders, dispersants, etc. may be added to the powder particles such as barium titanate ($BaTiO_3$) according to purposes of the present disclosure.

Meanwhile, a thickness td of the dielectric layer 111 may not be limited.

However, in general, if the dielectric layer is formed to be thin to have a thickness less than 0.6 μm, in particular, if the thickness of the dielectric layer is 0.41 μm or less, moisture resistance reliability may be degraded.

As described below, when Cu is evenly distributed in the interface between the dielectric layer and the internal electrode according to an exemplary embodiment in the present disclosure, even when the dielectric layer and the internal electrode are very thin, reliability may be improved, and thus, sufficient reliability may be ensured even when the thickness of the dielectric layer is 0.41 μm or less.

Therefore, when the thickness of the dielectric layer 111 is 0.41 μm or less, the effect of improving reliability according to the present disclosure may be more remarkable.

The thickness td of the dielectric layer 111 may refer to an average thickness of the dielectric layer 111 disposed between the first and second internal electrodes 121 and 122.

The average thickness of the dielectric layer 111 may be measured by scanning an image of a length-thickness (L-T) directional cross-section of the body 110 with a scanning electron microscope (SEM).

For example, regarding a certain dielectric layer extracted from an image of the length-thickness (L-T) cross-section taken at a central portion of the body 110 in the width direction with the SEM, thicknesses thereof may be measured at 30 points at equal intervals in the length direction, and an average value thereof may be calculated.

The thicknesses measured at 30 equally spaced points may be measured at a capacitance formation portion A referring to a region in which the first and second internal electrodes 121 and 122 overlap each other.

The body 110 may include the capacitance formation portion A formed inside the body 110 and forming capacitance with the first internal electrode 121 and the second internal electrode 122 disposed to face each other with the dielectric layer 111 interposed therebetween and cover portions 112 and 113 formed above and below the capacitance formation portion A.

In addition, the capacitance formation portion A is a part that contributes to formation of capacitance of the capacitor, which may be formed by repeatedly stacking a plurality of first and second internal electrodes 121 and 122 with the dielectric layer 111 interposed therebetween.

The upper cover portion 112 and the lower cover portion 113 may be formed by stacking a single dielectric layer or two or more dielectric layers on upper and lower surfaces of the capacitance formation portion A in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, a thickness of the cover portions 112 and 113 may not be limited. However, a thickness tp of the cover portions 112 and 113 may be 20 μm or less in order to more easily achieve miniaturization and high capacitance in the multilayer electronic component.

In addition, margin portions 114 and 115 may be disposed on side surfaces of the capacitance formation portion A.

The margin portions 114 and 115 may include a margin portion 114 disposed on the sixth surface 6 of the body 110 and a margin portion 115 disposed on the fifth surface 5 of the body 110. That is, the margin portions 114 and 115 may be disposed on both side surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance formation portion A in the width direction.

The internal electrodes 121 and 122 are alternately stacked with the dielectric layer 111.

The internal electrodes 121 and 122 may include first and second internal electrodes 121 and 122. The first and second internal electrodes 121 and 122 may be alternately disposed to face each other with a dielectric layer 111 configuring the body 110 interposed therebetween and may be exposed to the third and fourth surfaces 3 and 4 of the body 110, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4.

In this case, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed and subsequently sintering the green sheets.

In the internal electrodes 121 and 122, a coefficient of variation (CV) value of Cu/Ni (percent by weight) in a region thereof 5 nm deep from an interface with the dielectric layer may be 25.0% or less.

A work function of Ni is about 5.04 to 5.35, and a work function of Cu is about 4.53 to 5.10. Therefore, the work function tends to decrease as the content of Cu increases in the Ni—Cu alloy.

If the Cu content is non-uniformly distributed at the interface between the internal electrode and the dielectric layer, reliability may be deteriorated as the work function is not uniform. This is because the work function at a location where the Cu content is relatively high is lowered, thereby increasing the likelihood of current flow. Reliability may be improved as Cu is evenly distributed in the internal electrode, and in particular, reliability may be improved when Cu is uniformly distributed at the interface between the dielectric layer and the internal electrode.

According to an exemplary embodiment in the present disclosure, by controlling the CV value of Cu/Ni (percentage by weight) in the region of the internal electrode 5 nm deep from the interface with the dielectric layer 111 to 25.0% or less, the Cu content may be uniformly distributed at the interface between the internal electrodes 121 and 122 and the dielectric layer 111, thereby improving reliability.

If the CV value of Cu/Ni (percentage by weight) in the region of the internal electrode 5 nm deep from the interface with the dielectric layer 111 exceeds 25.0%, high temperature load reliability and moisture resistance reliability may become inferior.

Thus, the internal electrodes 121 and 122 preferably have the CV value of 25.0% or less of Cu/Ni (percentage by weight) in the region 5 nm deep from the interface with the dielectric layer 111.

However, in order to further improve moisture resistance reliability, in the internal electrodes 121 and 122, the CV value of Cu/Ni (percentage by weight) in the region 5 nm deeper from the interface with the dielectric layer may be 9.2% or less.

The CV value means that a standard deviation is expressed as a percentage over an average value.

In the internal electrodes 121 and 122, when the average value of Cu/Ni (percentage by weight) in the region thereof 5 nm deeper from the interface with the dielectric layer is x1 and a standard deviation of Cu/Ni (percentage by weight) in the region thereof 5 nm deep from the interface with the dielectric layer is S1, the CV value of Cu/Ni (percentage by weight) is s1/x1*100(%).

Referring to FIGS. 2 and 5, regarding a length of the body 110 taken at a central portion of the body 110 in the width direction at the center of the body in the width direction, a length of the body 110 in a cross-section in the thickness direction (L-T), and one internal electrode positioned at the center of the body in the thickness direction, a quantitative analysis may be performed on ten points p1 to p10 away by 5 nm from the upper and lower interface regions between the internal electrodes and the dielectric layer toward the internal electrode using energy dispersive X-ray spectrometer (EDS) to obtain each value of Cu/Ni (percent by weight). Thereafter, an average x1 and a standard deviation s1 of each of the 10 Cu/Ni (percent by weight) values may be obtained and a CV value of the Cu/Ni (percent by weight) may be calculated.

Meanwhile, the method of controlling the CV value of Cu/Ni (percentage by weight) may not be limited. For example, the CV value may be controlled by adjusting a particle diameter, sintering conditions, and the like of the conductive powder particles included in the conductive paste for internal electrodes.

For a specific example, the CV value of Cu/Ni (percentage by weight) may be controlled to 25.0% or less by controlling the average size of Cu powder particles included in the conductive paste for internal electrodes to 120 nm or less.

In addition, the CV value of Cu/Ni (percentage by weight) may be controlled to 9.2% or less by controlling the average size of Cu powder particles included in the conductive paste for internal electrodes to 50 nm or less.

Meanwhile, the content of Cu included in the internal electrode is not limited, but may be preferably 0.4 to 6.0 wt %.

If the Cu content is less than 0.4 wt %, the effect of improving reliability may be insufficient, and if the Cu content exceeds 6.0 wt %, reliability may be deteriorated even if Cu is uniformly distributed in the internal electrode.

According to an exemplary embodiment in the present disclosure, Ni and Cu included in the internal electrodes 121 and 122 may be included in the form of a Ni—Cu alloy.

As Ni and Cu are included in the form of a Ni—Cu alloy, the effect of Cu addition may be improved, and Cu included in the internal electrode may be evenly distributed in the internal electrode.

Meanwhile, the thickness te of the internal electrodes 121 and 122 may not be particularly limited.

However, in general, if the internal electrodes 121 and 122 are formed to be thin to have a thickness less than 0.6 µm, in particular, if the thickness of the internal electrodes 121 and 122 is 0.41 µm or less, moisture resistance reliability may be lowered.

As described above, when Cu is evenly distributed in the interface between the dielectric layer and the internal electrode according to an exemplary embodiment in the present disclosure, even when the dielectric layer and the internal electrode are very thin, reliability may be effectively improved, and thus, sufficient moisture resistance reliability may be ensured even when the thickness of the internal electrodes 121 and 122 is 0.41 µm or less.

Therefore, when the thickness of the internal electrodes 121 and 122 is 0.41 µm or less, the effect of improving reliability according to the present disclosure may be more remarkable and miniaturization and high capacitance of the capacitor component may be more easily achieved.

The thickness te of the internal electrodes 121 and 122 may refer to an average thickness of the internal electrodes 121 and 122.

The average thickness of the internal electrodes 121 and 122 may be measured by scanning an image of a length and thickness directional (L-T) cross-section of the body 110 with an SEM.

For example, in an image obtained by scanning a cross-section of the body 110 in the length and thickness directions (L-T) taken at a central portion of the body 110 in the width direction (W), certain first and second internal electrodes 121 and 122 may be extracted, and thicknesses thereof at 30 points at equal intervals in the length direction may be measured, and an average value of the measured thicknesses may be calculated.

The external electrodes 131 and 132 may be disposed on the body 110 and connected to the internal electrodes 121 and 122.

As shown in FIG. 2, the external electrodes 131 and 132 may be disposed on the third and fourth surfaces 3 and 4 of the body 110 and connected to the first and second internal electrodes 121 and 122, respectively.

In this exemplary embodiment, a structure in which the multilayer electronic component 100 has two external electrodes 131 and 132 is described, but the number or shape of the external electrodes 131 and 132 may be modified according to shapes of the internal electrodes 121 and 122 or other purposes.

Meanwhile, the external electrodes 131 and 132 may be formed of any material as long as the material has electrical conductivity such as a metal, and a specific material may be determined in consideration of electrical characteristics and structural stability, and further, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

For a more specific example of the electrode layers 131a and 132a, the electrode layers 131a and 132a may be sintered electrodes including a conductive metal and glass or resin-based electrodes including a conductive metal and a resin.

In addition, the electrode layers 131a and 132a may have a form in which a sintering electrode and a resin-based electrode are sequentially formed on the body. In addition, the electrode layers 131a and 132a may be formed by transferring a sheet including a conductive metal onto the body or by transferring a sheet including a conductive metal onto the sintering electrode.

A material having excellent electrical conductivity may be used as the conductive metal included in the electrode layers 131a and 132a, and the material is not particularly limited. For example, the conductive metal may be one or more of nickel (Ni), copper (Cu), and alloys thereof.

The plating layers 131b and 132b serve to improve mounting characteristics. The plating layers 131b and 132b are not limited in type and may be plating layers including at least one of Ni, Sn, Pd, and alloys thereof or may be formed of a plurality of layers.

For a more specific example of the plating layers 131b and 132b, the plating layers 131b and 132b may include a Ni plating layer or an Sn plating layer, and in this case, the Ni plating layer and the Sn plating layer may be sequentially formed on the electrode layers 131a and 132a or the Sn plating layer, the Ni plating layer, and the Sn plating layer may be sequentially formed on the electrode layers 131a and 132a. In addition, the plating layers 131b and 132b may include a plurality of Ni plating layers and/or a plurality of Sn plating layers. Further, the plating layers 131b and 132b may have a form in which a Ni plating layer and a Pd plating layer are sequentially formed on the electrode layers 131a and 132a.

A size of the multilayer electronic component 100 may not be particularly limited.

However, in order to achieve both miniaturization and high capacitance, the number of layers needs to be increased by reducing the thickness of the dielectric layer and the internal electrode, and thus, the effect of improving reliability according to the present exemplary embodiment may be remarkable in a multilayer electronic component having a 0402 size (length×width, 0.4 mm×0.2 mm) or less.

Accordingly, when the length of the multilayer electronic component is 0.44 mm or less and the width thereof is 0.22 mm or less, taking into account a manufacturing error and the size of external electrode, the reliability improvement effect according to the present disclosure may be more remarkable.

Hereinafter, a method of manufacturing a multilayer electronic component 100 according to an exemplary embodiment in the present disclosure will be described.

First, a plurality of ceramic green sheets are prepared.

The ceramic green sheet is for forming the dielectric layer 111 of the body 110, and a slurry may be prepared by mixing ceramic powder particles, a polymer, and a solvent, and the slurry may be formed in a sheet shape having a predetermined thickness through a method such as a doctor blade or the like.

Thereafter, a conductive paste for internal electrodes is printed with a predetermined thickness on at least one surface of each ceramic green sheet to form an internal electrode.

The conductive paste for internal electrodes includes Ni powder particles and Cu powder particles.

In this case, an average size of the Cu powder particles may be 120 nm or less. By controlling the average size of the Cu powder particles to be 120 nm or less, the CV value of Cu/Ni (percent by weight) in the region of the internal electrode 5 nm deep from the interface with the dielectric layer may be controlled to 25.0% or less.

In addition, the average size of the Cu powder particles may be 50 nm or less. By controlling the average size of the Cu powder particles to 50 nm or less, the CV value of Cu/Ni (percentage by weight) in the region of the internal electrode 5 nm deep from the interface with the dielectric layer may be controlled to 9.2% or less.

As a printing method of the conductive paste for internal electrodes, a screen printing method or a gravure printing method may be used.

Referring to FIG. 4, the ceramic green sheet on which the first internal electrode 121 is printed and the ceramic green sheet on which the second internal electrode 122 is printed are alternately stacked and pressed in a stacking direction to compress the plurality of stacked ceramic green sheets and the internal electrodes formed on the ceramic green sheets to form a stack.

In addition, at least one ceramic green sheet may be stacked above and below the stack to form cover portions 112 and 113.

The cover portions 112 and 113 may have the same composition as the dielectric layer 111 located inside the stack and differ from the dielectric layer 111 in that the cover portions 112 and 113 do not include internal electrodes.

Thereafter, each region of the stack corresponding to one capacitor is cut into a chip, and the chip is fired at high temperatures to complete the body 110.

Thereafter, exposed portions of the first and second internal electrodes exposed to both sides of the body 110 may be covered to form first and second external electrodes 131 and 132 such that the first and second external electrodes 131 and 132 are electrically connected to the first and second internal electrodes.

At this time, surfaces of the first and second external electrodes 131 and 132 may be plated with nickel or tin, if necessary.

Example

A sample chip in which internal electrodes were formed using a conductive paste for internal electrodes in which 6.0 wt % of Cu powder particles having the average size of Table 1 was added based on 100 wt % of Ni powder particles was prepared.

A CV value of Cu/Ni (percentage by weight) in a region of the internal electrode 5 nm deep from an interface with a dielectric layer was measured, and high temperature load reliability and moisture resistance reliability were evaluated.

As for the CV value, regarding a length of the body 110 taken at a central portion of the body 110 in the width direction at the center of the body in the width direction, a length of the body 110 in a cross-section in the thickness direction (L-T), and one internal electrode positioned at the center of the body in the thickness direction, a quantitative analysis may be performed on ten points p1 to p10 away by 5 nm from the upper and lower interface regions between the internal electrodes and the dielectric layer toward the internal electrode using energy dispersive X-ray spectrometer (EDS) to obtain each value of Cu/Ni (percent by weight), and an average x1 and a standard deviation s1 of each of the 10 Cu/Ni (percent by weight) values may be obtained and the CV value (=s1/x1*100(%)) of the Cu/Ni (percent by weight) may be calculated.

As for high-temperature load reliability, high-temperature load test was carried out on 400 samples per test No. under the conditions of 125° C. and 8 V, and MTTF was measured. In this case, a time during which the insulation resistance was 10 kΩ or less was determined as a failure time.

As for moisture resistance reliability, 8V was applied to 400 samples per Test No. at a temperature of 85° C. and with relative humidity of 85% for 60 hours, samples whose insulation resistance value was lowered to below $1/10$ relative to initial values were evaluated as failures, and the percentage of the number of defective samples was described.

TABLE 1

| Test No. | Average size of Cu powder particle (nm) | CV value (%) | MTTF (hr) | Moisture resistance failure (%) |
|---|---|---|---|---|
| 1 | 20 | 4.1 | 59.5 | 0.7 |
| 2 | 30 | 6.3 | 55.1 | 1.3 |
| 3 | 50 | 9.2 | 57.8 | 1.5 |
| 4 | 70 | 13.5 | 56.6 | 5.0 |
| 5 | 90 | 18.8 | 53.3 | 5.5 |
| 6 | 120 | 25.0 | 50.3 | 7.5 |
| 7* | 130 | 26.1 | 45.5 | 9.9 |
| 8* | 150 | 28.5 | 40.2 | 18.5 |
| 9* | 180 | 29.0 | 38.4 | 24.8 |

It can be seen that, Test Nos. 7 to 9 in which the CV value is more than 25.0%, have short MTTF and a high moisture resistance defect rate.

Meanwhile, it can be seen that, Test Nos. 1 to 6 in which the CV value is 25.0% or less have high temperature reliability and excellent moisture resistance reliability.

In addition, it can be seen that, Test Nos. 1 to 3 in which the CV value is 9.2% or less have very low moisture resistance failure, thus having excellent moisture resistance reliability.

As set forth above, according to exemplary embodiments of the present disclosure, reliability of the multilayer electronic component may be improved.

While exemplary embodiments have been shown and described above, it will be apparent to those skilled in the art that modifications and variations could be made without departing from the scope of the present disclosure as defined by the appended claims.

What is claimed is:

1. A multilayer electric component comprising:
a body including a dielectric layer and internal electrodes alternately stacked with the dielectric layer interposed therebetween; and external electrodes disposed on the body and connected to the internal electrodes,
wherein the internal electrodes are sintered and include Cu and Ni and a coefficient of variation (CV) value of Cu/Ni (percent by weight) in the internal electrodes is non-zero and 25.0% or less.

2. The multilayer electric component of claim 1, wherein the internal electrodes comprise a conductive material, the conductive material including Cu powder particles having an average size of 120 nm or less.

3. The multilayer electric component of claim 2, wherein the average size of the Cu powder particles is 50 nm or less.

4. The multilayer electric component of claim 1, wherein the CV value is non-zero and 9.2% or less.

5. The multilayer electric component of claim 1, wherein content of Cu in the internal electrodes is in a range from 0.4 wt % to 0.6 wt %.

6. The multilayer electric component of claim 1, wherein the internal electrodes comprise an Ni—Cu alloy.

7. The multilayer electric component of claim 1, wherein an average thickness of the internal electrodes is 0.41 μm or less.

8. The multilayer electric component of claim 1, wherein an average thickness of the dielectric layer is 0.41 μm or less.

9. The multilayer electronic component of claim 1, wherein the multilayer electronic component has a length of 0.44 mm or less and a width of 0.22 mm or less.

10. A multilayer ceramic capacitor comprising:
internal electrodes alternately stacked with dielectric layers interposed therebetween, the internal electrodes comprising a sintered conductive material including Cu and Ni, a coefficient of variation (CV) of a ratio of Cu to Ni (percent by weight) in the internal electrodes is non-zero and 25.0% or less.

11. The multilayer electronic component of claim 10, wherein the CV value is (s1/x1)×100, wherein s1 is standard deviation of the ratio of Cu to Ni and x1 is average value of the ratio of Cu to Ni.

12. The multilayer electronic component of claim 10, wherein content of Cu in the internal electrodes is in a range from 0.4 wt % to 6.0 wt %.

13. The multilayer electronic component of claim 10, wherein the conductive material including Cu powder particles having an average size of 120 nm or less.

14. A multilayer ceramic capacitor comprising internal electrodes comprising a sintered conductive material, the conductive material including Cu powder particles having an average size of 120 nm or less,
wherein content of Cu in the internal electrodes is in a range from 0.4 wt % to 6.0 wt %, and
wherein a coefficient of variation (CV) value of a ratio of Cu to Ni (percent by weight) in the internal electrodes is greater than zero and 25.0% or less.

15. The multilayer ceramic capacitor of claim 14, wherein the CV value is (s1/x1)×100, wherein s1 is standard deviation of the ratio of Cu to Ni and x1 is average value of the ratio of Cu to Ni.

16. The multilayer ceramic capacitor of claim 14, wherein the CV is in a range from 4.1% to 25.0%.

* * * * *